United States Patent [19]

Brittain et al.

[11] Patent Number: 5,349,901
[45] Date of Patent: Sep. 27, 1994

[54] APPARATUS FOR THE TREATMENT OF OIL FILTERS FOR LOW CONTAMINANT RECYCLE

[76] Inventors: Charles Brittain, 10177 Elkwood, Sun Valley, Calif. 91352; Gilbert Ross, 17640 Vincennes, Northridge, Calif. 91324; Jack D. Brittain, 10863 Mountair Ave., Tujunga, Calif. 91042

[21] Appl. No.: 62,590

[22] Filed: May 17, 1993

[51] Int. Cl.⁵ .......................... B30B 9/20; B30B 3/04
[52] U.S. Cl. ................................ 100/37; 15/256.51; 100/121; 100/174
[58] Field of Search ............. 100/121, 161, 173, 174, 100/37; 15/256.51

[56] References Cited

U.S. PATENT DOCUMENTS

| | | | |
|---|---|---|---|
| 72,872 | 12/1867 | Lucas | 100/174 X |
| 75,101 | 3/1868 | Willoughby | 100/174 X |
| 241,119 | 5/1881 | Boomer | 100/161 X |
| 1,933,837 | 11/1933 | Arnold | 15/256.51 |
| 2,317,533 | 4/1943 | Joslin | 15/256.51 |
| 3,207,063 | 9/1965 | Major | 100/121 X |
| 4,919,824 | 4/1990 | Creps et al. | 100/37 X |

FOREIGN PATENT DOCUMENTS

| | | | |
|---|---|---|---|
| 748003 | 6/1933 | France | 100/161 |
| 422699 | 7/1948 | Italy | 100/121 |
| 465408 | 5/1952 | Italy | 100/121 |

*Primary Examiner*—Stephen F. Gerrity
*Attorney, Agent, or Firm*—Louis J. Bachand

[57] ABSTRACT

Oil filter elements are processed to be substantially free of oil and thus contamination by passage through a series of counterrotating nip rolls which squeeze the filter element media and carry the separated oil circularly to be doctored off opposite the nip and collected for recycle separate from the filter element media.

23 Claims, 2 Drawing Sheets

APPARATUS FOR THE TREATMENT OF OIL FILTERS FOR LOW CONTAMINANT RECYCLE

TECHNICAL FIELD

This invention has to do with recycling of oil filter components, especially oil filter elements, and, more particularly, with apparatus for treatment of the oil filter element components of oil filters to have low levels of contamination, so as to be disposable without special permits being required. The term "oil" herein refers not only to petroleum based fluids commonly used in lubrication and cooling of engines and other types of machinery, but to other fluids used in a variety of applications including dry cleaning and refrigeration. Such oils are purified with filter media, usually fibrous or particulate masses, which are herein referred to as "filter elements". Low contaminant recycle refers to recyclable products which are so reduced in contaminant content as to be safely disposable without special precautions, e.g. in landfills.

BACKGROUND

As sources of toxic waste and other contaminants of air, soil and water are located and regulated, everyday activities of people are increasingly affected. The heretofore simple task of changing the oil in one's automobile, now leads to a chain of activities designed to prevent the used filter product and its residue of metal-contaminated oil from reentering the environment. Systems have been developed to collect, process and dispose of the filters and their residues, e.g. U.S. Pat. No. 5,182,842 discloses such a system. The final disposition of the segregated components of the oil filters, ranging from canisters to bases to O-ring seals and the paper plastic or like fibrous or particulate mass of media forming the filter elements is controlled to protect air, land and water. The filter media can find reuse as fuel or be deposited in landfills if in low contaminant condition including the substantial removal of all residual oil therefrom, so that heavy metals carried by the oil are absent from the filter element.

SUMMARY OF THE INVENTION

It is therefore an object of the present invention to provide apparatus for the low contamination recycling of filter elements. It is another object to provide apparatus for the removal of substantially all the residual oil from oil filter elements and on a production basis. It is another object to provide apparatus for driving from filter elements so much of the oil content that the level of heavy metal remaining in the filter elements, if any, is such that the filter elements are safe for disposal or reuse in an appropriate manner.

These and other objects of the invention to become apparent hereinafter are realized in apparatus for the low contamination recycling of oil filter elements comprising a frame, a sequence of counterrotating pairs of nip rolls supported within the frame in sequential relation, means to feed a continuing succession of oil containing oil filter elements to between the nip rolls for a series of sequential compressions transferring separated oil onto the nip rolls while passing said oil separated filter elements beyond said nip rolls to recycle, and means diverting the separated oil off the nip rolls before recombination with filter elements between the nip rolls as the nip rolls rotate toward each other.

In this and like embodiments: the frame typically comprises left and right walls, and means to mount the nip roll pairs in vertical sequence on the walls to define a vertically disposed series of nips for passage of the filter elements; the frame includes a top wall, the filter element feeding means being supported by the frame top wall and comprising an upwardly open, downwardly narrowing receiver adapted to receive a succession of oil filters and direct the oil filters to between the nip rolls; there is further included a motor and a gear train for rotating the nip rolls; there is further included oil collection means comprising a pan arranged to collect diverted oil from the nip rolls and means to pass the collected oil to recycle separate from and beyond the oil separated filter elements; the frame includes a bottom wall, the bottom wall defining separate paths for oil separated filter elements and separated oil to recycle; the frame supports three pairs of counterrotating nip rolls, the rolls being vertically aligned to form a series of three nips vertically spaced to permit filter elements to drop freely from one nip to the next; the nip rolls are rigid drums having a resilient surface layer for engaging and squeezing the filter elements; the diverting means is adjustable into and out of engagement with the nip rolls; and, the diverting means comprises a series of doctor blades engaging the surface of the nip rolls substantially diametrically opposed to the nip formed by the rolls.

In a more particularly preferred embodiment, the invention provides an apparatus for the low contamination recycling of oil filter elements comprising a frame having side, top and bottom walls, a vertical sequence of counterrotating pairs of nip rolls supported within the frame, means to feed a continuing succession of oil containing oil-filter elements downward through the frame top wall to between the nip rolls for a series of sequential compressions transferring separated oil onto the nip rolls while passing the oil separated filter elements beyond the nip rolls to recycle, and means diverting the separated oil off the nip rolls to recycle before recombination with filter elements between the nip rolls as the nip rolls rotate toward each other.

In this and like embodiments, the frame left and right walls journal the nip roll pairs in vertical sequence on the walls to define a vertically disposed series of nips for passage of the filter elements; the frame top wall includes a filter element feeding funnel adapted to receive a succession of filters and direct the oil filters to between the nip rolls; there is also included a motor and a gear train for rotating the nip rolls; the frame bottom wall defines an aperture through which oil separated filter elements drop to a collection receptacle, and pan oil collection means beyond the aperture arranged to collect diverted oil from the nip rolls, and outlet means to pass the collected oil to recycle separate from and beyond the oil separated filter elements; the frame bottom wall is domed about the aperture to carry separated oil away from the aperture toward the outlet; the pairs of nip rolls are vertically spaced to permit filter elements to drop freely from one nip to the next: the nip rolls are rigid drums having a resilient surface layer for engaging and squeezing the filter elements; the diverting means is adjustable into and out of engagement with the nip rolls; the diverting means comprises a series of doctor blades engaging the surface of the nip rolls substantially diametrically opposed to the nip formed by the rolls; and, there is also included left and right vertically shiftable brackets supported by the frame, the doctor blades being carried by the brackets for movement to and from engagement with the nip roll drums.

In another embodiment, the invention provides apparatus for the removal of oil from oil filter elements comprising a rigid frame of side, top and bottom walls, a series of left and right nip rolls within the frame journaled by the walls for counterrotation to define a vertical series of nips adapted to squeeze filter elements to separate the oil therefrom, the frame top wall including means to drop filter elements into the uppermost of the nips, the frame bottom wall being aperture to pass oil separated filters dropped from the lowermost of the nips, the frame bottom wall surrounding the aperture being adapted to collect oil separated from the oil filters, left and right arrays of doctor blades supported by the frame top wall for vertical movement to and from engagement with the nip rolls opposite the nips, the doctor blades acting to divert separated oil from the nip rolls being carried from the locus of the nips on the nip rolls to collection by the frame bottom wall for recycle.

THE DRAWINGS

The invention will be further described as to an illustrative embodiment in accordance with the attached drawings in which.

DETAILED DESCRIPTION OF THE INVENTION

Figure 1:
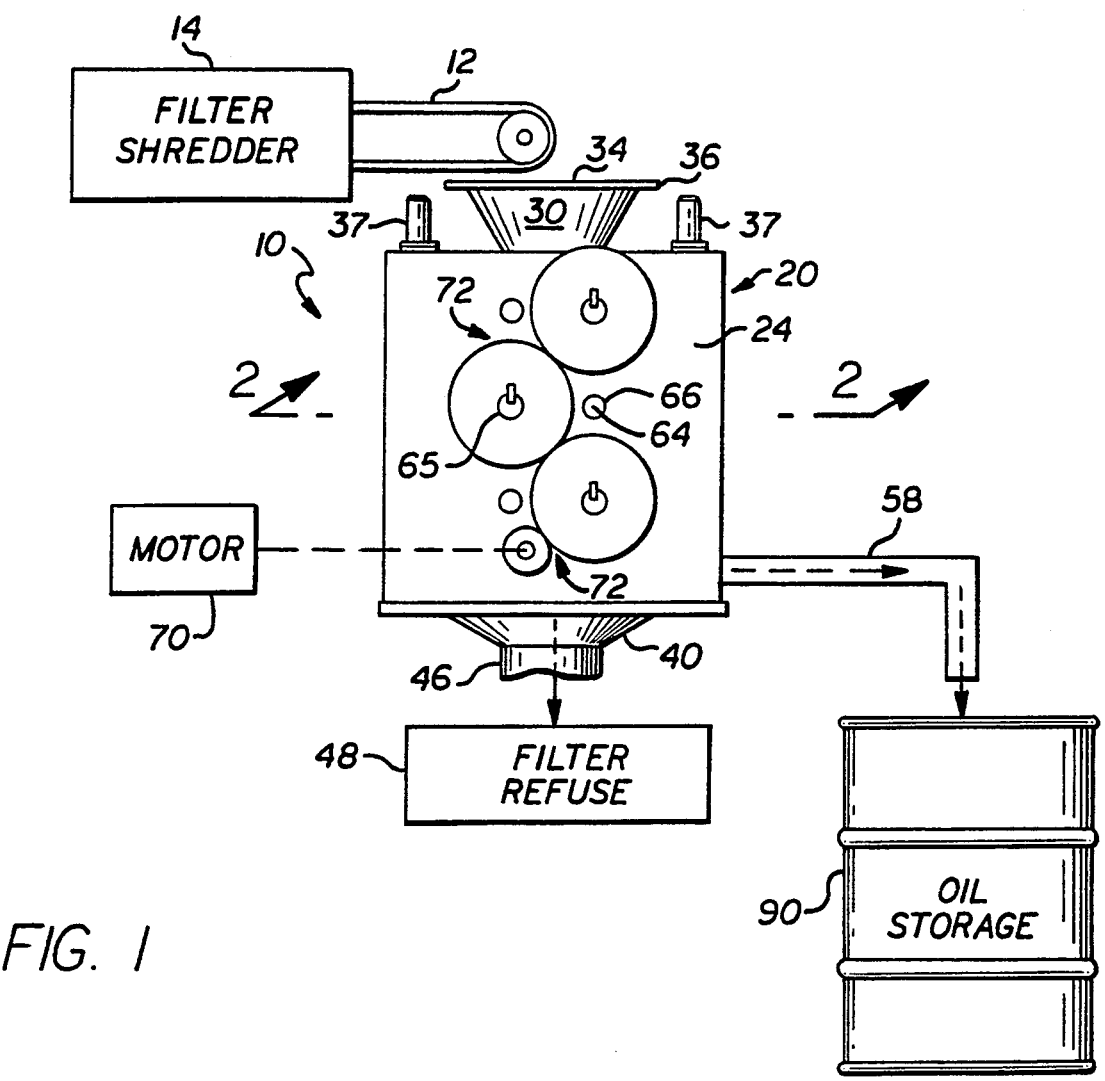
FIG. 1 is a partly schematic partly diagrammatic view of the invention apparatus.
Figure 2:
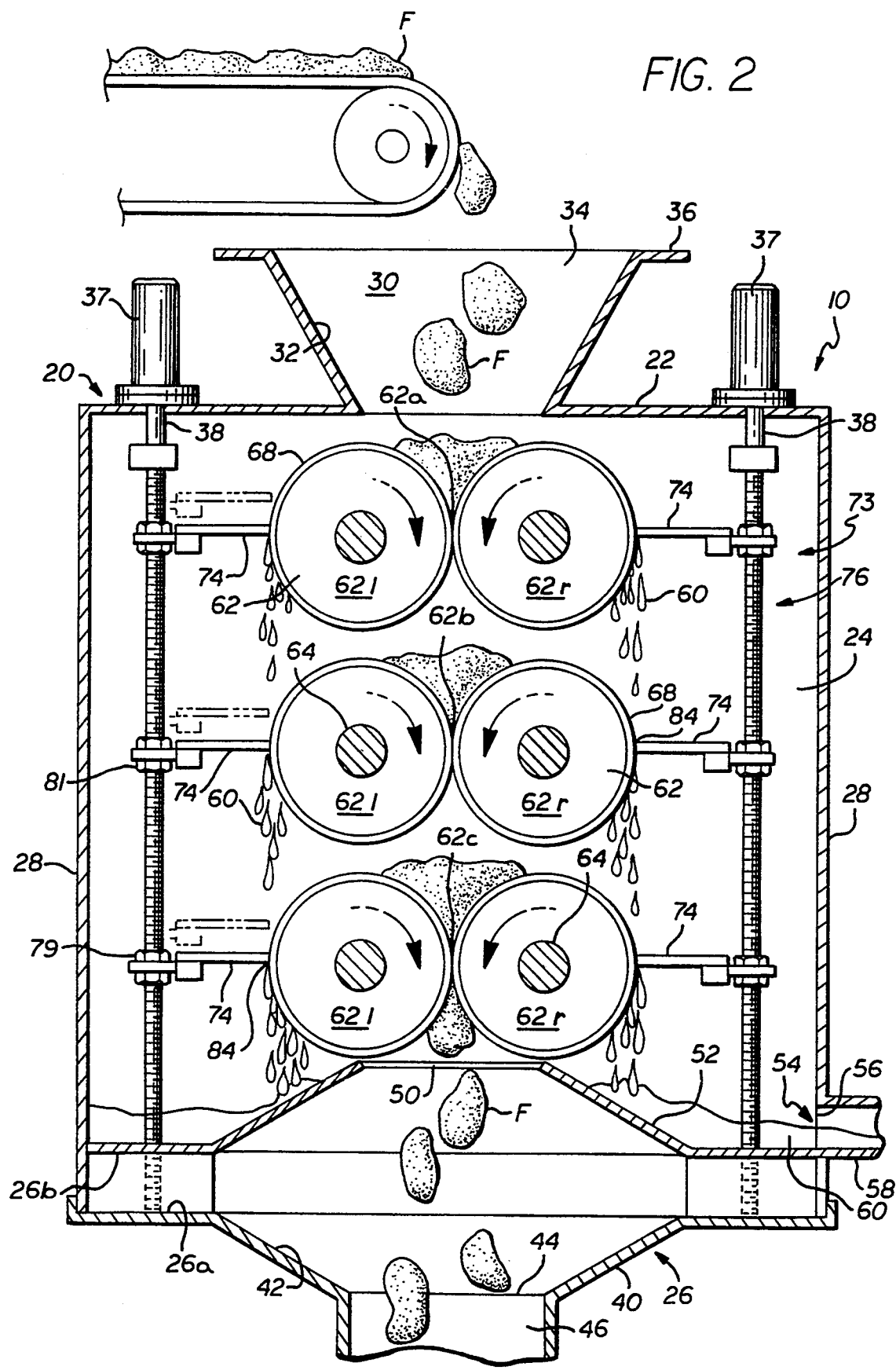
FIG. 2 is a view taken on line 2—2 in FIG. 1.

With reference now to the drawings in detail, the invention apparatus is shown at 10 in FIGS. 1 and 2 located just beneath a conveyor 12 delivering filter elements F already separated from the canister and base of the oil filter in a shredder shown schematically at 14, the details of which are not a part of this invention but may be gleaned from the aforementioned U.S. Pat. No. 5,182,842.

The filter element-oil separation apparatus 10 comprises a generally rectangular sheet metal frame 20 having top wall 22, side walls 24, and bottom wall 26 and front and rear walls 28. Frame top wall 22 is fabricated to define an inlet funnel 30 comprising a sloped wall portion 32 having upward opening 34 surrounded with flange 36. Hydraulic lifters 37 with depending pistons 38 are mounted atop frame top wall 22 for purposes to appear.

The frame bottom wall 26 is formed with a lower section 26a and an upper section 26b. Frame bottom wall lower section 26a effectively closes off the lower end of the frame 20 and centrally defines an exit funnel 40 comprising a sloped wall portion 42 having downward opening 44 meeting chute 46. Chute 46 empties into filter refuse recycle container 48.

Frame bottom wall upper section 26b has a central opening 50 in registration with lower section 26a opening 44, surrounded by a domed portion 52 of the bottom wall upper section 26b. An oil outlet 54 is formed by the bottom wall upper section 26b leading to opening 56 in rear wall 28 which is connected to pipe 58 for taking separated oil 60 from the frame 20.

Within the frame 20 a vertically disposed series of nip roll pairs 62 each comprising a left and right roll 62l and 62r are provide, carried on shafts 64 journaled in bearings 65 set within openings 66 in opposed side walls 22, 24. The successive pairs of rolls 62 are vertically spaced a distance that is not narrowly critical but should be sufficient to permit filter element F to fall freely between successive pairs of the rolls, and not allow already passed filter elements F to block exit of newly passing filter elements from the next above pair of nip rolls.

As the filter elements F are successively passed downwardly through the nips 62a, 62b and 62c of the apparatus, they are each squeezed by the convergence of the opposed rolls 62l and 62r and simultaneously drawn into a new shape in passing through the nips, the better to yield up incorporated oil. The tolerance of the roll pairs 62 is nominally zero, but the rolls 62l and 62r are preferably metal drums having a resilient surface covering 68 which compresses slightly at the nip exerting squeezing pressure of the filter element F therein.

Figure 3:
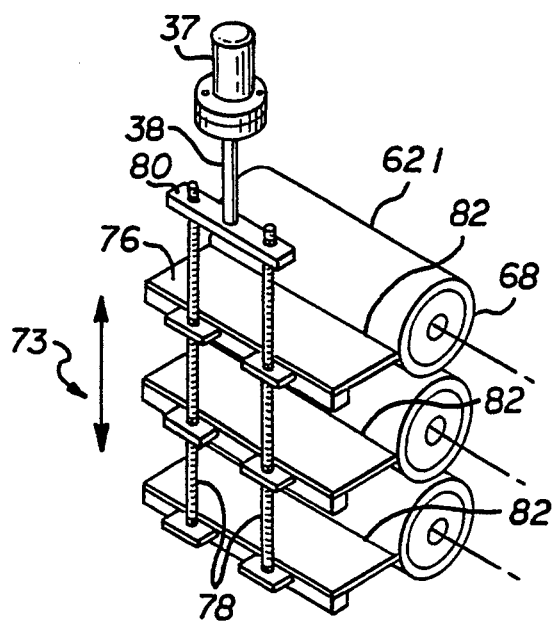
FIG. 3 is a detail view of the doctor blade array.

As shown in FIGS. 2 and 3, the filter elements F drop from the funnel 30 onto the first or uppermost pair of rolls 62. The rolls 62 are counterrotated by motor 70 driving a gear reduction train 72 mounted on the outside of the frame 20 to the stub axle shafts 64 on which the rolls 62 are carried. As shown, alternate ones of said rolls 62 are driven by the gear train 72.

The filter elements F are drawn to and through the nip 62a and drop into the next nip, 62b, and then to the lowermost nip, 62c. At each nip 62 a, b, c added oil 60 is squeezed out. The oil 60 squeezed from rolls 62 is carried down and out by the roll on which it is deposited in the squeezing operation. The number of roll pairs 62 is not narrowly critical and may be more or less than three, and the arrangement of rolls may be other than simply opposed pairs as shown, such as a series of vertically engaged and laterally offset rolls (not shown).

The oil 60 on the rolls 62 is collected to block its return into the filter elements F and for recycle. Collection is effected by doctor blading the roll surface covering 68. Thus, an array 73 comprising six doctor blades 74 carried three in a row on a bracket 76 comprising verticals 78 and cross-member 80, is provided to maintain the doctor blades at a locus of engagement 82 of the rolls 62 generally diametrically opposite the nip, e.g. nip 62b. The doctor blades 74 are rigid members suitably secured to the bracket verticals 78 with upper and lower nuts 79, 81 threaded on the vertical above and below each doctor blade. The engagement edge 84 of the doctor blades 74 is not narrowly critical, but is suitably such as will exert a considerable force to squeegee off the oil while not damaging the roll covering 68. The oil 60 drops by gravity to the frame bottom wall upper section 26b, where the domed portion 52 directs the oil away from the central opening 50 and toward the outlet 46 whence it is carried by pipe 58 to oil storage barrel 90 for collection and recycle.

The oil-separated filter elements F are passed centrally through the nips 62a, b, c and drop by gravity, away from the oil 60, into the center opening 50 in the frame bottom wall upper section 26b and thence the lower section 26a and into the refuse recycle container 48.

The doctor blades 74 are urged into contact with the rolls 62 by piston 37, supported on the frame top wall 22, as described, which acts on bracket vertical 78 to lower the doctor blades into forceful contact with the rolls 62. When the apparatus 10 is not in operation, the piston 37 is drawn upwardly and the doctor blades 74 are lifted off the rolls.

The apparatus is designed for the rapid processing of large numbers of filter elements, as would be required in a production facility recycling numerous filters on a regular basis.

Test results with this apparatus indicate that all significant oil content is removed from the filter elements, such that no quantity of toxic metals requiring special disposition of the oil-separated filter elements remains in the filter elements, allowing disposal of the oil-separated filter elements in landfills, and/or burning thereof for fuel.

The foregoing objects are thus met.

We claim:

1. Apparatus for the low contamination recycling of oil filter elements comprising a frame, a sequence of counterrotating pairs of nip rolls supported within the frame in sequential relation, means to feed a continuing succession of oil containing oil filter elements to between said nip rolls for a series of sequential compressions transferring separated oil onto said nip rolls while passing said oil separated filter elements beyond said nip rolls to recycle, means diverting said separated oil off said nip rolls before recombination with filter elements between said nip rolls as said nip rolls rotate toward each other, and wall means defining below said sequence of nip rolls separate paths to recycle for oil separated filter elements and separated oil.

2. Apparatus according to claim 1, in which said frame comprises left and right walls, and means to mount said nip roll pairs in vertical sequence on said walls to define a vertically disposed series of nips for passage of said filter elements.

3. Apparatus according to claim 1, in which said frame includes a top wall, said filter element feeding means being supported by said frame top wall and comprising an upwardly open, downwardly narrowing receiver adapted to receive a succession of oil filters and direct said oil filters to between said nip rolls.

4. Apparatus according to claim 1, including also a motor and a gear train for rotating said nip rolls 5. Apparatus according to claim 1, in which said wall means defines collection means comprising a pan arranged to collect diverted oil from said nip rolls, and means to pass said collected oil to recycle separate from and beyond said oil separated filter elements.

6. Apparatus according to claim 1, in which said frame includes a bottom wall defining said wall means, said bottom wall having an aperture defining a first recycle path for oil separated filter elements and having a downward slope beyond said aperture defining a second recycle path for said separated oil.

7. Apparatus according to claim 1, in which said frame supports three pairs of counterrotating nip rolls, said rolls being vertically aligned to form a series of three nips vertically spaced to permit filter elements to drop freely from one nip to the next.

8. Apparatus according to claim 1, in which said nip rolls are rigid drums having a resilient surface layer for engaging and squeezing said filter elements.

9. Apparatus according to claim 1, in which said diverting means is adjustable into and out of engagement with said nip rolls.

10. Apparatus according to claim 1, in which said diverting means comprises a series of doctor blades engaging the surface of said nip rolls substantially diametrically opposed to the nip formed by said rolls.

11. Apparatus for the low contamination recycling of oil filter elements comprising a frame having side, top and bottom walls, a vertical sequence of counterrotating pairs of nip rolls supported by the frame, means to feed a continuing succession of oil-containing oil filter elements downward through said frame top wall to between said nip rolls for a series of sequential compressions transferring separated oil onto said nip rolls while passing said oil separated filter elements beyond said nip rolls to recycle, and means diverting said separated oil off said nip rolls to recycle before recombination with filter elements between said nip rolls as said nip rolls rotate toward each other, said frame bottom wall defining separate paths to recycle for said oil separated filter elements and said separated oil.

12. Apparatus according to claim 11, in which said frame left and right walls journal said nip roll pairs in vertical sequence on said walls to define a vertically disposed series of nips for passage of said filter elements.

13. Apparatus according to claim 12, in which said frame top wall includes a filter element feeding funnel adapted to receive a succession of oil filters and direct said oil filters to between said nip rolls.

14. Apparatus according to claim 13, including also a motor and a gear train for rotating said nip rolls.

15. Apparatus according to claim 13, in which said frame bottom wall defines a first path for separated filter element comprising a bottom wall aperture through which oil separated filter elements drop to a collection receptacle and said bottom wall further defines a separate path for separated oil comprising pan oil collection means beyond said aperture arranged to collected diverted oil from said nip rolls, and including also outlet means to pass said collected oil to recycle.

16. Apparatus according to claim 15, in which said frame bottom wall is domed about said aperture to carry separated oil away from said aperture toward said outlet.

17. Apparatus according to claim 15, in which said pairs of nip rolls are vertically spaced to permit filter elements to drop freely from one nip to the next.

18. Apparatus according to claim 17, in which said nip rolls are rigid drums having a resilient surface layer for engaging and squeezing said filter elements.

19. Apparatus according to claim 18, in which said diverting means is adjustable into and out of engagement with said nip rolls.

20. Apparatus according to claim 19, in which said diverting means comprises a series of doctor blades engaging the surface of said nip rolls substantially diametrically opposed to the nip formed by said rolls.

21. Apparatus according to claim 20, including also left and right vertically shiftable brackets supported by said frame, said doctor blades being carried by said brackets for movement to an from engagement with said nip roll drums.

22. Apparatus for the removal of oil from oil filter elements comprising a rigid frame of side, top, and bottom walls, a series of left and right nip rolls within said frame journaled by said walls for counterrotation to define a vertical series of nips adapted to squeeze filter elements to separate the oil therefrom, said frame top wall including means to drop filter elements into the uppermost of said nips, said frame bottom wall being apertured to pass oil separated filters dropped from the lowermost of said nips, said frame bottom wall surrounding said aperture being adapted to collect oil separated from said oil filters; left and right arrays of doctor blades supported on said frame for vertical movement to and from engagement with said nip rolls opposite said nips, said doctor blades acting to divert separated oil from said nip rolls being carried from the locus of said nips on said nip rolls to collection by said frame bottom wall for recycle.

23. Method for low contamination recycling oil filter elements, including feeding a succession of oil-containing filter elements to a sequence of nip roll pairs supported by a frame having a wall below said nip roll pairs, sequentially squeezing said filter elements to separate said oil from said filter elements, diverting separated oil from said nip roll pairs along a first path to recycle, and diverting oil-separated filter elements along a second path to recycle separate from said first path, said first and second paths being defined by said frame bottom wall.

* * * * *